US010345496B2

United States Patent
Ludovici et al.

(10) Patent No.: US 10,345,496 B2
(45) Date of Patent: Jul. 9, 2019

(54) MINIATURE GRISM SYSTEM FOR ASTRONOMICAL SPECTROSCOPY

(71) Applicant: UNIVERSITY OF IOWA RESEARCH FOUNDATION, Iowa City, IA (US)

(72) Inventors: Dominic Ludovici, Coralville, IA (US); Robert Mutel, Solon, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 0 days.

(21) Appl. No.: 15/620,893

(22) Filed: Jun. 13, 2017

(65) Prior Publication Data

US 2017/0357038 A1    Dec. 14, 2017

Related U.S. Application Data

(60) Provisional application No. 62/349,200, filed on Jun. 13, 2016.

(51) Int. Cl.

| G02B 5/04 | (2006.01) |
| G02B 5/18 | (2006.01) |
| G02B 23/04 | (2006.01) |
| G02B 27/42 | (2006.01) |
| G02B 27/30 | (2006.01) |
| G01J 3/00 | (2006.01) |

(52) U.S. Cl.
CPC .............. *G02B 5/1814* (2013.01); *G01J 3/00* (2013.01); *G02B 5/04* (2013.01); *G02B 23/04* (2013.01); *G02B 27/30* (2013.01); *G02B 27/4244* (2013.01)

(58) Field of Classification Search
CPC .......... G02B 5/1814; G02B 5/18; G02B 5/04; G02B 23/04; G02B 27/30; G02B 27/4244

USPC ......................................................... 359/399
See application file for complete search history.

(56) References Cited

U.S. PATENT DOCUMENTS 6,069,859 A * 5/2000 Hayashi ............... G02B 5/1833
  369/103
6,834,069 B1 * 12/2004 Bergmann ........... G02B 5/1814
  372/57

(Continued)

OTHER PUBLICATIONS

Doyon, et al. The JWST (FGS) and (NIRISS), Space Telescopes and Instrumentation 2012: Proc. of SPIE vol. 8442, 84422R, pp. 84422R-1 thru 84422R-13, 2012 SPIE, https://www.spiedigitallibrary.org/conference-proceedings-of-spie/8442/84422R/The-JWST-Fine-Guidance-Sensor-FGS-and-Near-Infrared-imager/10.1117/12.926578.full.*

(Continued)

Primary Examiner — William R Alexander
(74) Attorney, Agent, or Firm — Smith Gambrell & Russell LLP

(57) ABSTRACT

The invention is directed at a miniature grism system. The miniature grism system is a single compact device that comprises a grism with collimating and focusing optics. In an aspect, the grism includes at least one prism and a grating. In an aspect, the miniature grism system, and more specifically the grism, includes at least one prism which is placed on either side of the grating. The focusing optics and the collimating optics are found on opposite sides of the grism system, sandwiching the prism and grating of the grism. In an aspect, the miniature grism system is configured to be retained within a filter wheel. The miniature grism system is configured to be used with telescopes having a small focal ratio.

20 Claims, 5 Drawing Sheets

(56) References Cited

U.S. PATENT DOCUMENTS

| | | | | |
|---|---|---|---|---|
| 7,155,354 B1* | 12/2006 | Mooney | ............... | G01J 3/02 |
| | | | | 702/65 |
| 2005/0248758 A1* | 11/2005 | Carron | ............... | G01J 3/02 |
| | | | | 356/301 |
| 2008/0030728 A1* | 2/2008 | Nguyen | ............... | G01J 3/02 |
| | | | | 356/328 |
| 2008/0291950 A1* | 11/2008 | McCallion | ......... | G02B 26/0883 |
| | | | | 372/20 |
| 2010/0004887 A1* | 1/2010 | Mooney | ............... | G01J 3/02 |
| | | | | 702/66 |
| 2015/0009508 A1* | 1/2015 | Bachmann | ............ | H01S 3/0812 |
| | | | | 356/479 |

OTHER PUBLICATIONS

Mar, et al., Micromachined silicon grisms for infrared optics, Applied Optics / vol. 48, No. 6 / Feb. 20, 2009, pp. 1016-1029, https://www.osapublishing.org/ao/abstract.cfm?uri=ao-48-6-1016.*

* cited by examiner

MINIATURE GRISM SYSTEM FOR ASTRONOMICAL SPECTROSCOPY

CLAIM OF PRIORITY

This application claims priority to U.S. Provisional Patent Application No. 62/349,200, filed on Jun. 13, 2016, which is relied upon and incorporated herein in its entirety by reference.

FIELD OF INVENTION

This invention generally relates to a combination of prisms and gratings commonly referred to as a grating prism or grism.

BACKGROUND OF THE INVENTION

Slitless spectroscopy is astronomical spectroscopy done without a slit to allow only light from a large region to be diffracted. Slitless spectroscopy works best in sparsely populated fields, as it spreads each point source out into its spectrum, and crowded fields will be too confused to be useful. Slitless spectroscopy also faces the problem that for extended sources, nearby emission lines will overlap. Grisms are often used in slitless spectroscopy. Grisms are a combination of gratings and prisms arranged so that light at a chosen central wavelength passes straight along the optical axis. The advantage of a grism is that all optical components can be placed along a straight line. However, when using a grism, and in spectrometers in general, there can be a problem with capturing images, necessitating two separate cameras to be used, one for imaging (without the grism) and one for spectroscopy (with the grism). The grism is inserted into a camera beam that is already collimated or produced from a large focal ratio. The grism then creates a dispersed spectrum centered on the object's location in the camera's field of view.

While prior art gratings and grisms systems have been used by a number of astronomical telescopes to perform slitless spectroscopy, the systems have many shortcomings. For example, the Rspec Star Analyser (RSA) is a simple diffraction grating housed in a 1.25" filter cell. The RSA is designed to be mounted into an eyepiece or filter slot for an astronomical camera. However, the RSA only comprises a simple grating without prisms or collimating optics. Because of this, the RSA suffers from focal plane curvature which prevents the entire visible spectrum to be focused during a single exposure. In addition, the RSA employs a very low resolution grating (e.g., 100 to 200 lines per millimeter) to minimize the effects of focal plan curvature. The use of a low resolution creates a drawback, namely that closely spaced spectral lines become blended together at low resolution. Also, for most astronomical sources, the spectral line width will be smaller than the resolution provided by the RSA. This results in blending the line with neighboring continuum, and thus a lower signal sensitivity to weak, narrow features.

In addition, existing compact spectrographic systems lack the correcting optics necessary to produce a focused spectrum over the entire visible spectrum. For example, the Hubble Space Telescope (HST) also utilizes grisms in order to perform slit-less spectroscopy, but only in both the ultra-violet and the infrared wavelengths using a Wide Field Camera 3 (WFC3) instrument. These grisms do not operate between 450 nm and 800 nm, leaving the majority of the visible spectrum un-observed. Additionally, the grisms installed within WFC3 all have low spectral resolutions. In some instances, these grisms can be better for seeing the overall shape of the continuum emissions since the light is not spread out as much over the detector. However, high spectral resolution is better for observing the narrow spectral lines. Further, the HST has a large focal ratio of f/24. Because of this, the light passing through the grism is approximately parallel and the degradation of the focus is negligible. However, many other telescopes have a much smaller focal ratio, with which a simple grism would be unable to focus.

Further, while some instruments do utilize internal collimating optics to correct for focus problems, these systems utilize large external collimators unsuitable for small telescopes. For example, the Very Large Telescope (VLT) utilizes the Focal Reducer and low dispersion Spectrograph (FORS). The FORS instrument possesses collimating/focal reducing optics. However, the FORS collimator is located before the filter wheel and must be used for all imaging filters and grisms. The design of the FORS instrument allows it to be used on a telescope with a small focal ratio. But the FORS is extremely large (several feet long) and is very heavy. An instrument of a similar design to FORS would be too large to install on amateur or university class telescopes. Additionally, FORS is a custom instrument designed specifically for the VLT, leading to an extremely high cost.

Last, current moderate to high resolution spectrometer systems for small telescopes require the user to remove the imaging camera to install the spectrometer, preventing the user from easily switch between imaging and spectroscopy. For remote controlled or robotic telescopes, users must dedicate their telescope to either spectroscopy or imaging, and cannot switch between the two without sending someone to the remote site to change the instrument.

Therefore, there is a need for a low cost grism system that includes a high resolution grating that can disperse visible light using optical telescopes with small focal ratios. In addition, there is a need for a system that allows users to quickly switch between imaging and spectroscopy, without the need of removing or installing equipment on the telescope.

SUMMARY OF THE INVENTION

This invention relates to a miniature grism system. The miniature grism system is a single compact device that comprises a grism with collimating and focusing optics. In an aspect, the grism includes at least one prism and a grating. In an aspect, the miniature grism system, and more specifically the grism, includes at least one prism which is placed on either side of the grating. The focusing optics and the collimating optics are found on opposite sides of the grism system, sandwiching the prism and grating of the grism. In an aspect, the miniature grism system is configured to be retained within a filter wheel. The miniature grism system is configured to be used with telescopes having a small focal ratio.

In an aspect, the miniature grism system is configured to let all light from a comparatively large region through for analysis, allowing for spectra of multiple sources to be collected at once. In addition, the miniature grism system has an increased resolution compared to a simple grating, which allows the narrow spectral lines to be fully resolved, thus increasing the signal to noise ratio of narrow spectral lines. Other features and advantages of the invention will become apparent to one with skill in the art upon examination of the following drawings and detailed description. It is intended that all such additional features and advantages be included herein within the scope of the present invention.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the following description, numerous specific details are set forth. However, it is to be understood that embodiments of the invention may be practiced without these specific details. In other instances, well-known methods, structures and techniques have been shown in detail in order not to obscure an understanding of this description.

Figure 4:
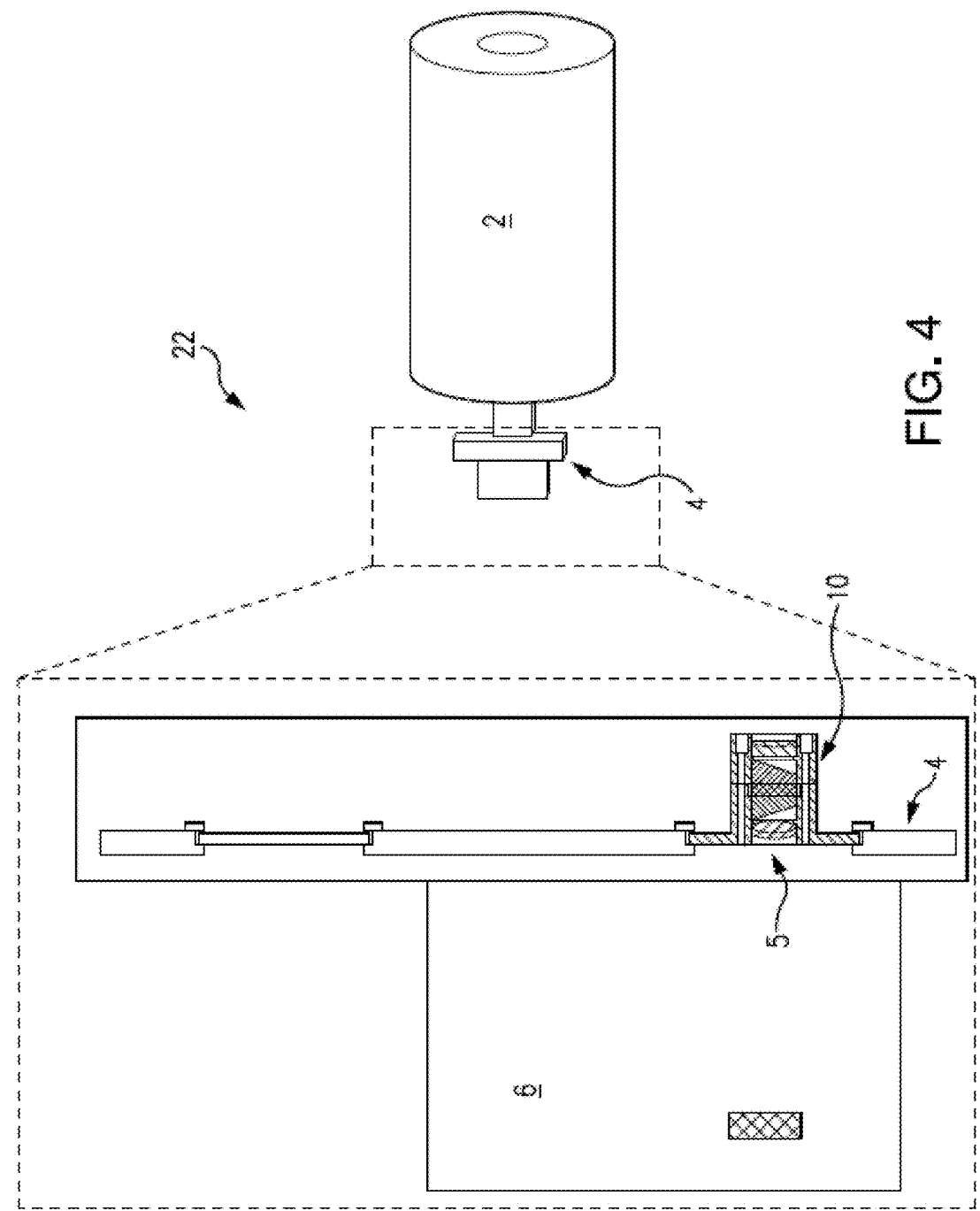
FIG. 4 is a schematic representation of a miniature grism system utilized with a filter wheel of a telescope.

The present invention is directed towards a miniature grism system 10. In an aspect, the miniature grism system 10 is configured for use with telescopes 2 having filter wheels 4, as shown in FIG. 4. The miniature grism system 10 is a device that splits visible light into its constituent wavelengths. The miniature grism system 10 functions as a spectrometer that produces low-resolution spectra of astronomical objects. The resulting spectra are used to determine temperature, chemical composition, and velocities of astronomical objects such as stars and galaxies.

The miniature grism system 10 uses an optical design called a 'grism' (grating plus prism), discussed in detail below. The miniature grism system is 10 configured to be used on telescopes 2 of all sizes, including those of modest aperture (~0.-2 m-1.0 m), which are typically owned by amateur astronomers and colleges/universities for education and research. In an aspect, the miniature grism system 10 utilizes a grism that is designed and packaged in a novel way that allows the miniature grism system 10 to be easily added to traditional astronomical telescope systems with a filter wheel 4 and camera 6 (See FIGS. 3 and 4). In an aspect, the camera 6 includes a charged couple device (CCD). The miniature grism system 10 can be conveniently installed in an empty filter slot 5 of a filter wheel 4. In an aspect, the miniature grism system 10 can be utilized with a telescope 2 that lacks a filter wheel by positioning the system 10 in front of the camera 6. For example, the miniature grism system 10 can be attached to the eye piece of some telescopes 2, similar to the Rspec Star Analyser. However, in such aspects, the miniature grism system 10 would more than likely have to be removed by the user from the telescope 2 if the user wants to switch back to imaging. A benefit of the miniature grism system 10 is that the system 10 can be used with the normal components of the telescope 2, with the spectra generated by the miniature grism system 10 recorded on the user's astronomical camera 6, and are calibrated and displayed using software. In an aspect, the miniature grism system 10 can utilize spectrograph software known in the art.

The resolving power (R) (wavelength/spectral resolution of the spectrograph) of the miniature grism system 10 is dependent on the combination of the properties of the grating, prisms, as well as the placement of the miniature grism system 10 in relation to the CCD of a camera 6 and filter wheel 4. For example, as the resolution increases, the prism(s) get larger in order to ensure the light travels that straight through the miniature grism system 10, thus increasing the overall size of the miniature grism system 10. Further, the location of the miniature grism system 10 in relation to the camera 6 of the telescope 2 can have an impact on the resolution as well. Placing the miniature grism system 10 further from the camera 6 can result in a greater resolution, while placing the system 10 closer the camera 6 can result in less resolution.

In an aspect, R can range from ~100 to ~1000 depending on the details of the telescope 2 and choice of grating and prism(s). In an exemplary aspect (see FIGS. 1-4), the miniature grism system 10 has a moderate resolution of approximately 300. If the grism system 10 needs to be placed approximately 40 mm away from the CCD of the camera 6, and an R of approximately 300 is desired, the grism system 10 will need to utilize a grism (i.e., combination grating and prism) of 600 lines per millimeter. If the system 10 was placed half as far from the CCD (20 mm), the resolution would be cut in half (R~150). Thus the final resolution provided by the miniature grism system 10 is dependent on the distance between the camera 6 and the grism system 10.

In an aspect, as illustrated in FIGS. 1-4, the miniature grism system 10 is a single compact device that comprises an enclosure 20 containing a grism 40, a collimating optics 70 and a focusing optics 80. In an aspect, these components can be placed as close as possible to one another without touching. In an aspect, the order of the prisms and the grating of the grism 40 are not important, but the collimating optics 70 should be put in place before the grism and the focusing optics 80 should be placed in after the grism 40.

Figure 1:
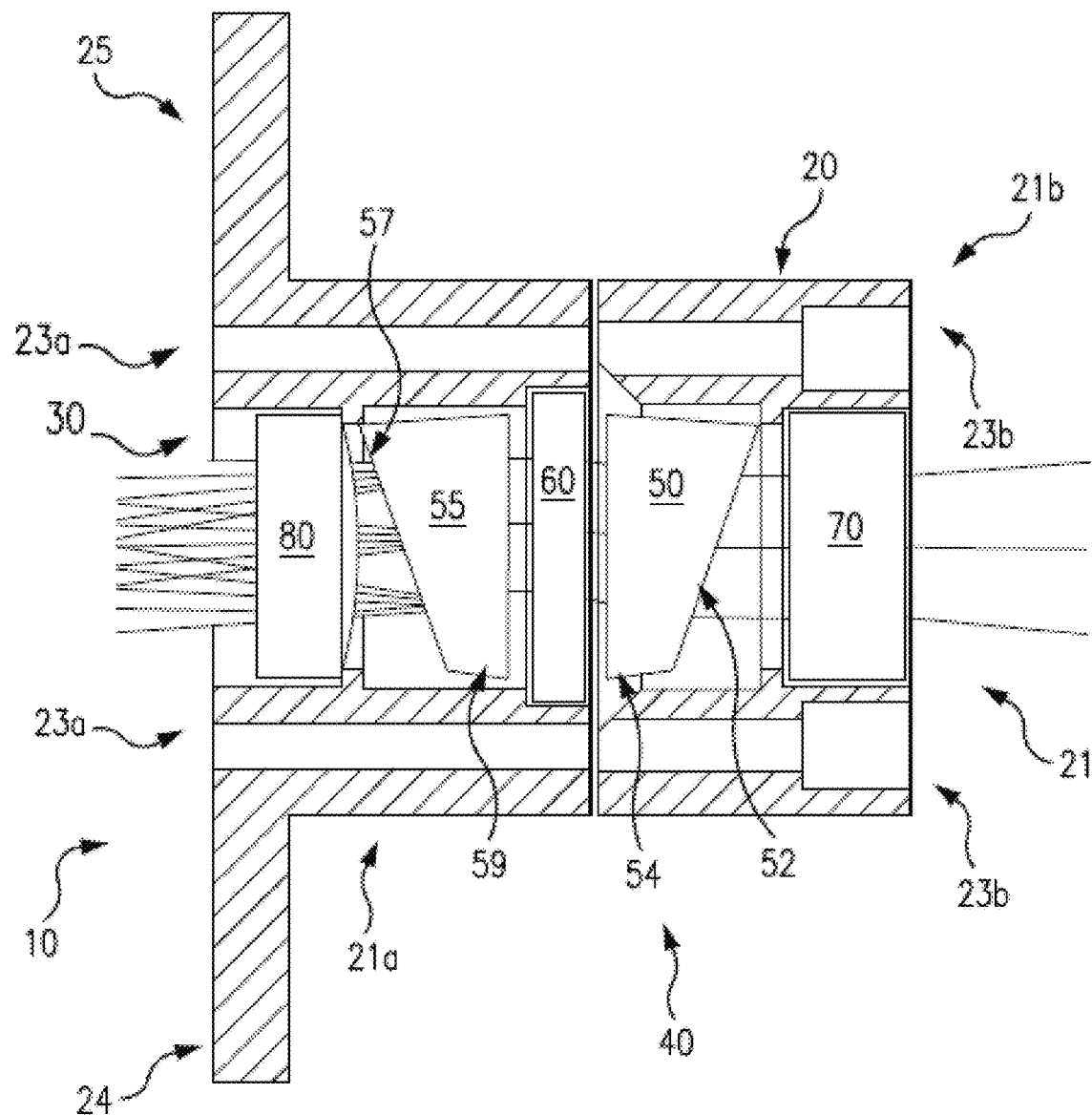
FIG. 1 is a schematic cross-sectional view of a miniature grism system according to aspects of the present invention.
Figure 7:
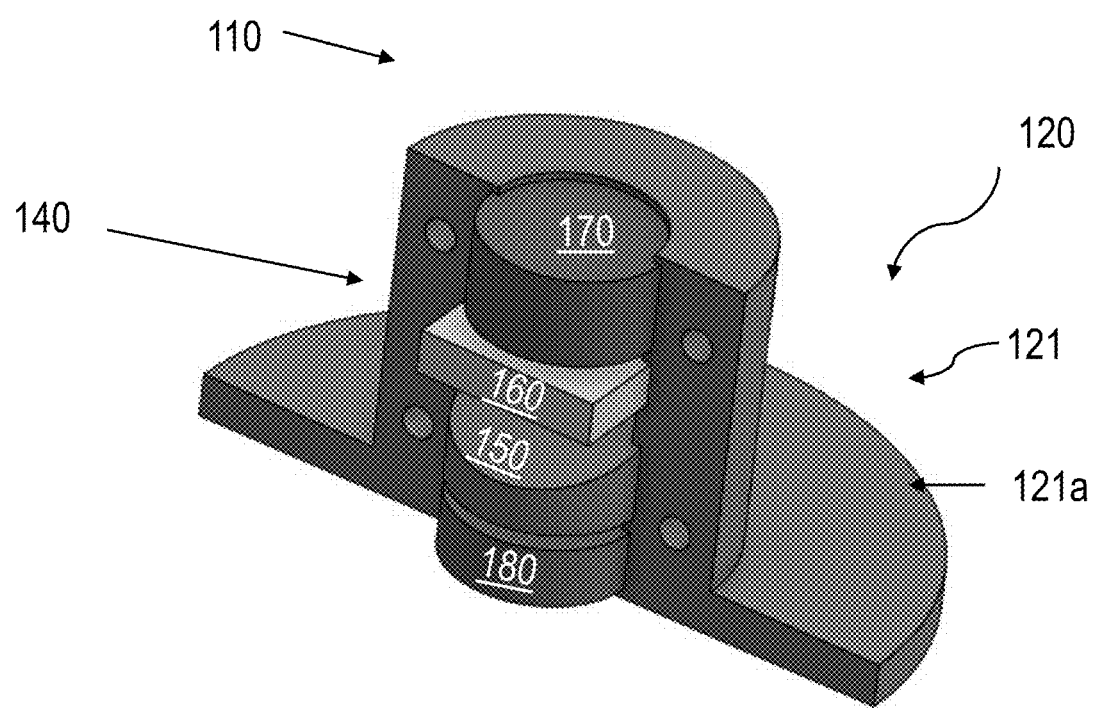

As discussed above, the grism 40 is a combination of at least one prism 50 and a transmission grating 60. In an aspect, the grism 40 can include multiple prisms 50, 55 and a transmission grating 60, as shown in FIG. 1. However, a grism 140 of a miniature grism system 110 can utilize a single prism 150 and grating 160 as shown in FIG. 7. In order to keep the miniature grism system 10 as compact as possible, it is desirable to include the least number of prisms possible. However, the higher resolution desired from the grism system 10, the more prisms that will need to be used. For example, in some aspects, the miniature grism system 10 can include four prisms. In an aspect, the grism 40 utilizes prisms 50, 55 with anti-reflection coatings and a blazed transmission grating 60. In an aspect, the grism 40 can be assembled from off the shelf prisms and gratings. In other aspects, the grism 40 can be made from customized prisms without, which allow for a thinner grism 40. At least one side of the prism has an angle, which is dependent on the resolution of the grating 60.

In an aspect, the transmission grating 60 can be a standalone grating, or it can be etched directly onto a surface 54, 59 of a prism 50, 55. In the case where there are multiple prisms 50, 55 the transmission grating 60 is preferred to be positioned between the multiple prisms 50, 55. For example, in the case of the transmission grating 60 being etched onto a surface of one the prisms 50, 55, the side on which the grating 60 is etched faces the other prism 54.

In one aspect, the grism 40 of the miniature grism system 10 includes at least two prisms 50, 55 which are placed on opposite sides of the grating 60. With the two prisms 50, 55 the light (at the central wavelength) travels along the optical axis, centering the spectrum on the center of a camera 6 (see FIG. 4), allowing the entire visible spectrum to be brought into focus at the same time. As discussed above, the grism system 110 can utilize a grism 140 with a single prism 150 (see FIG. 7). In such cases, it is desirable for the single prism 150 to have a larger dispersion (e.g., by increasing the angle of the glass making up the prism or by choosing a prism with glass with a higher index of refraction). In such instances in which a single prism 150 is used, the spectrum produced can be laterally displaced, potentially leading to part of the spectrum spilling off of an edge of the detector of the camera 6, especially for smaller detectors. For example, if the spectrum produced by the grism 40 is 12 mm long and the CCD detector in the camera 6 is 13 mm long, using two prisms 50, 55 would allow the whole spectrum to be centered on and recorded by the detector. Using only one prism, the spectrum could be shifted by 1.5 mm or more, causing one end of the spectrum not to be recorded or examined as that portion has fallen outside the CCD detector. Therefore, in such cases when a single prism 150 is utilized, a larger CCD detector can be utilized to prevent loss of capture of the entire spectrum. The use of a single prism 150 decreases the overall length of the miniature grism system 110.

In an aspect, the collimating optic 70 comprises a collimating lens 70. In other aspects, the collimating optic 70 can include multiple lenses coupled to one another. For example, the collimating optic 70 can include two lenses adhered to one another to form an achromatic lens. Likewise, the focusing optic 80 can also comprise a focusing lens 80, or can be made of multiple lenses 80. In another aspect, the focusing optic 80 can further comprise mirrors. The collimating optics 70 and the focusing optics 80 are found on opposite ends of the grism system 10, sandwiching the grism 40, including the prism(s) 50, 55 and grating 60. Further, as shown in FIG. 7, a grism 140 utilizing a single prism 150 can include a collimating optic 170 and a focusing optic 180.

In an aspect, all optical components of the miniature grism system 10 can be made from commonly available optical glasses and can be anti-reflection coated to improve efficiency. Further, the focal length, and thus the thickness of the collimating optics, is determined by the focal ratio of the telescope. In an aspect, the miniature grism system is configured to work with telescoped with ratios faster than f/12. As shown in FIG. 1, the miniature grism system 10 is configured to work with a telescope 2 that has a focal ratio of f/6.8. The focal length and the thickness of the focusing optics 80 are determined by the distance between the miniature grism system 10 and the camera 6. The deviation angle (i.e., the sum of deflections as the light enters and exits a prism), and thus the thickness of the prism(s) 50, 52, is determined by the resolution of the grating 60. For example, lower resolution gratings will need a lower deviation angle and thus smaller prisms.

In addition, the desired center wavelength can also dictate the grating resolution of the grating 60 and the angle of the prisms 50, 55. For example, centering on the visible spectrum can lead to a 600 line per mm grating 60 with the use of two 10 degree prisms 50, 55. In the aspect, the thickness of the grating 60 can range between approximately 1 mm and 10 mm. For example, commercially available blazed gratings 60 have been found to be 3 mm thick, whereas holographic gratings 60 can be less than 1 mm. However, in other aspects, a thinner grating 60 or even etching the grating directly onto the prism 50 is possible. In an aspect, a blazed grating 60 can be utilized, which increases the efficiency of the miniature grism system 10. As for diameters of the collimating and focusing optics 70, 80, this is determined by the focal ratio of the converging light beam. The section of the beam captured can be made bigger by moving the miniature grism system 10 away from camera 6. In an aspect, 12.7 mm diameter optics for both the collimating and focusing optics 70, 80 will be suitable for most commercially available systems; however, they may have to be enlarged under special circumstances.

As discussed above, the components of the miniature grism system 10 are contained within an enclosure 20. The collimator optics 70 is positioned within the enclosure 20 at the incoming light end. In an aspect, the collimating optics 70 includes an achromatic lens 70, and has a focal length that matches the focal ratio (i.e., the focal length divided by the aperture) of the telescope 2. For example, most commercially available telescope systems 2 have focal ratios between f/4 to f/15, resulting in a collimating optics 70 with a focal length between −50 mm and −150 mm. As shown in FIG. 1, the collimator optics 70 includes a collimator lens with a focal length of −75 mm. However, in other aspects, the collimator optics 70 can have a different focal length. In addition, the collimator optics 70 can include a collimator lens approximately 12.7 mm in diameter, but can be larger based upon the location of the miniature grism system 10 from the camera 6.

As shown in FIG. 1, the grism 40 is adjacent the collimator optics 70. As shown, the grism 40 comprises two prisms 50, 55. However, as discussed above, in other embodiments, one prism or more than two prisms can be used. Returning to FIG. 1, the collimator optics 70 is adjacent a first prism 50 of the grism 40, on the opposite side of the grating 60. In an aspect, the first prism 50 has an angled/slanted side 52 and a flat side 54. In an aspect, the slanted side 52 is oriented to face the collimating optics 70 when placed inside the enclosure 20. In an aspect, the only limitation of the deviation angle of the prisms 50, 55 is that deviation needs to match the deviation produced by the grating 60. For example, if two prisms 50, 55 are used, the total deviation angle of the two needs to equal in some to the deviation produced by the grating. In an aspect, the slanted side 52 of the first prism 50 is slanted at an angle of eighteen degrees and eight minutes that provides a ten degree ray deviation angle, which matches the angle of the slanted side 57 of the second prism 55, for a total deviation of thirty six degrees and sixteen minutes. However, in other aspects, the prisms 50, 55 can have slanted sides 52, 57 oriented at different angles (i.e., the angles can be other values than eighteen degrees and eight minutes, as well as the angles between the prisms 50, 55 can be different from one another). If only one prism is used, it must have a deviation totaling what is needed for the grating. For instance, if we wanted to use only one prism in the system to match the deviation of the two prism system discussed above, a prism with a slanted angle of 36 degrees and 16 minutes is needed.

In an aspect, the deviation needs to be enough to bring the center wavelength to the center axis. The prism ray deviation angle depends on the grating resolution of the grating 60 used. The total refraction angle of the prism(s) 50, 55 must equal the deviation caused by the light passing through the transmission grating 60. For example, a 300 line (i.e., the number of parallel linear etchings in the glass per millimeter that diffract the light) per millimeter grating 60 would use two 5° prisms, a 1200 line per millimeter would need two twenty 20° prisms.

Next to the flat side 54 of the first prism 50 is the grating 60. In an aspect, the grating 60 comprises a transmission grating 60. In an aspect, the transmission grating 60 can comprise a ruled grating 60. In other aspects, a holographic grating can be used to save costs. In an aspect, the transmission grating 60 can comprise a 600 line $mm^{-1}$ grating 60. Such a grating 60 results in a factor of 3 to 6 increase in resolution in comparison to the Rspec Star Analyser. However, in other aspects, other gratings 60 with other resolutions (e.g., 300 lines per mm, 1200 lines per mm) can be utilized. In addition, the size of the transmission grating 60 should be the same or larger than the other optical components. In an aspect, the transmission grating 60 is a blazed transmission grating 60 that include triangular shaped grooves instead of flat grooves, which increases the overall efficiency of the miniature grism system 10 by forcing more light into the desired spectral order. However, in other aspects, non-blazed grating 60 can be used. While FIG. 1 shows a separate stand alone grating 60, the grating 60 can be incorporated/etched into a surface of a prism(s) 50, 55 in other embodiments.

As shown in FIG. 1, adjacent the grating 60 on the opposite side of the first prism 50 is a second prism 55. Similar to the first prism 50, the second prism 55 includes a slanted side 57 and a flat side 59, with the flat side 59 adjacent the grating 60. In an aspect, the second prism 55 shares the same properties with the first prism 50. Having the prisms 50, 55 match ensures the light is not offset from the optical axis, as would happen with only one prism. However, non-matched prisms still function fine, just with an offset.

Adjacent the slanted side 57 of the second prism 55 is the focusing optics 80. In an aspect, the focusing optics 80 includes a focusing lens 80. In one aspect, the focusing lens 80 is an achromatic lens 80. In an aspect, the focusing optics 80 has a focal length that matches the physical distance between the filter wheel 4 and the camera 6. In an aspect, is the focal length/physical distance between the filter wheel 4 and the camera 6 is between 30 and 60 mm. As shown in FIG. 1, the focusing optics 80 is configured to be a +50 mm focusing lens 80. The focusing lens 80 focuses the spectrum to be captured by the camera.

Figure 5:
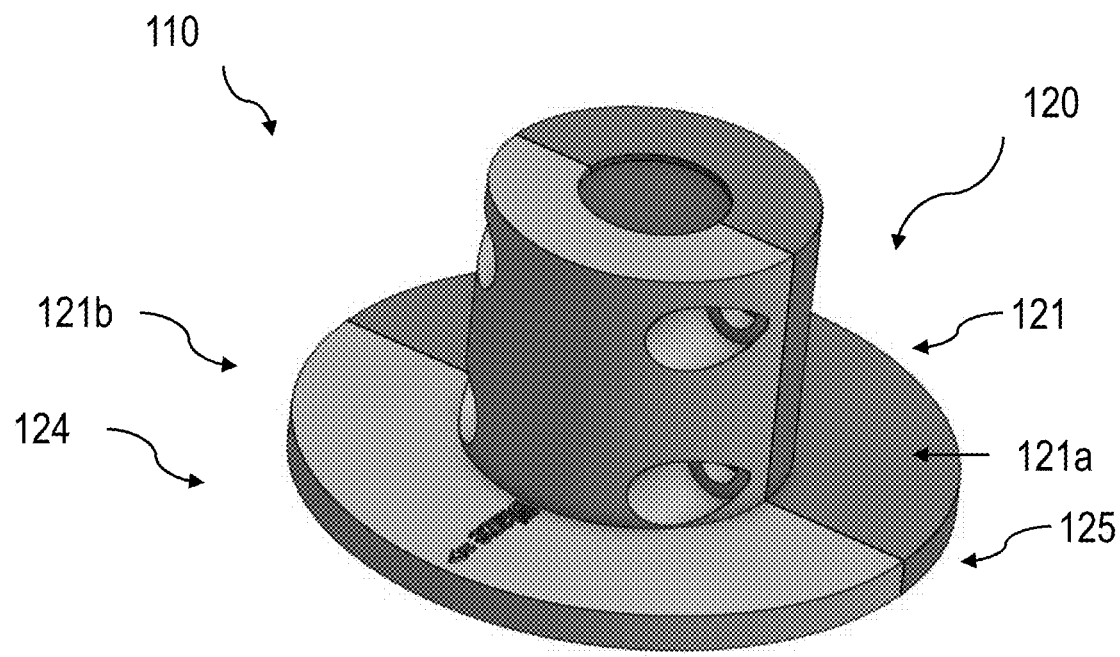
FIGS. 5-7 are schematic representations of a miniature grism system according to an aspect of the present invention.
Figure 6:
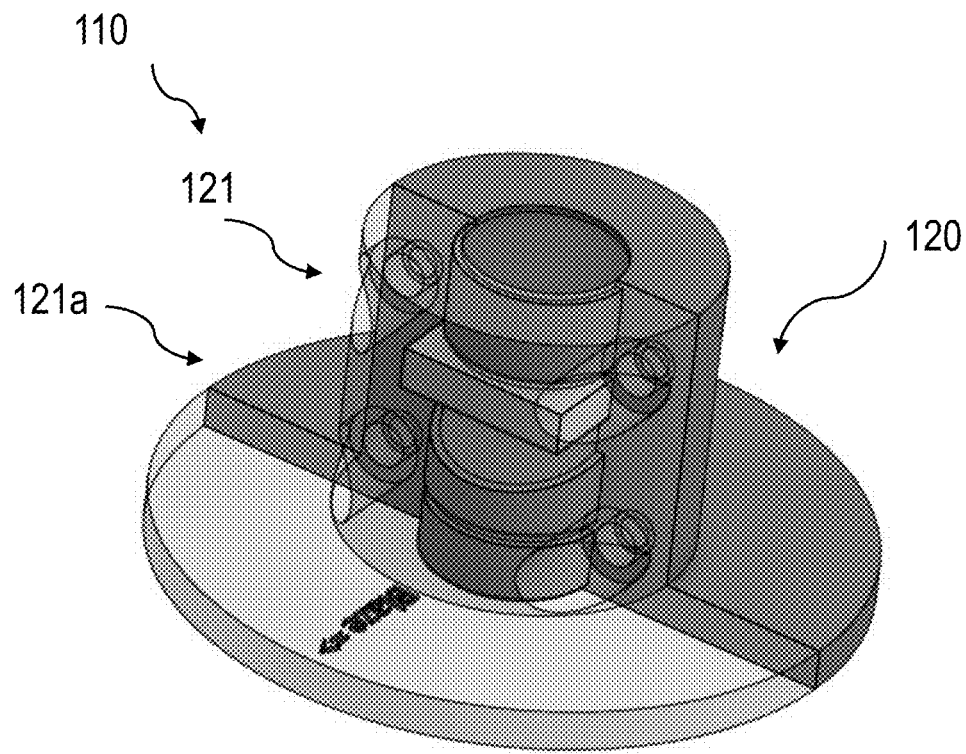

In an aspect, the enclosure 20 includes a cylindrical body 21 divided into a first portion 21a and a second portion 21b, as shown in FIG. 1. In another aspect, as shown in FIGS. 5-7, the grism enclosure 120 of a miniature grism system 110 can be a cylindrical body 121 divided down the middle into a first portion 121a and a second portion 121b, making it easier to install the optical components. In other embodiments, the enclosure 20 can be divided into various different components for ease of assembly. In an aspect, the enclosure 20 can be made of various materials, including, but not limited to, plastics, 3D printable materials, and machineable materials. The first and second portions 21a, 21b are removably coupled together through removable fastening devices 22 (See FIGS. 2-3) that are received within fastener apertures 23a, 23b (FIG. 1). The first portion 21a and second portion 21b have apertures 23a, 23b that are configured to align with one another to receive the fasteners 22. In an aspect, not all of the apertures 23a, 23b (four shown in FIG. 2) need to receive fasteners 22, just enough to secure the portions 21a, 21b to one another. In other embodiments of the present invention, other securing means can be used to secure the optic components within the enclosure. For example, the portions 21a, 21b could use a slot tab securing method. In other embodiments, the enclosure 20 could have corresponding openings to the optic components that could be pressed in.

The enclosure 20 includes a cavity 30 configured to hold and retain the grism 40 (including the prism(s) 50, 55 and grating 60) the collimating optics 70, and the focusing optics 80. In an aspect, a combination of annular grooves, protrusions, and edges with the use of set screws (not shown) are configured to retain the above referenced components in place within the cavity 30. In an aspect, the set screws can comprise nylon tipped set screws. When the optical components are placed within the cavity 30, the components can be arranged as seen in FIG. 1. In addition, all of the components can be fixed within their respective position. While the prisms 50, 55 could in theory be re-arranged, this can result in lateral displacements of the spectrum on the camera 6 as discussed above. In addition, while space is shown between the components in FIG. 1, the amount of space is not critical to this invention. As discussed above, the components can be placed as close as possible to one another without touching.

Figure 2:
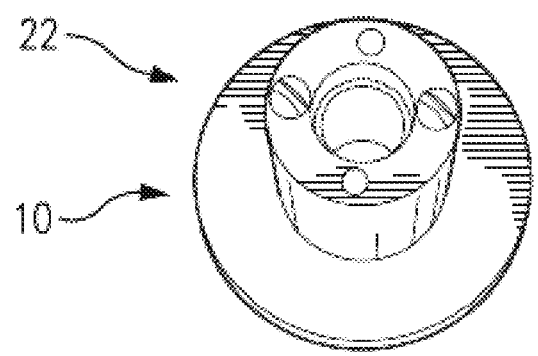
FIG. 2 is a top perspective view of the miniature grism system according to aspects of the present invention.
Figure 3:
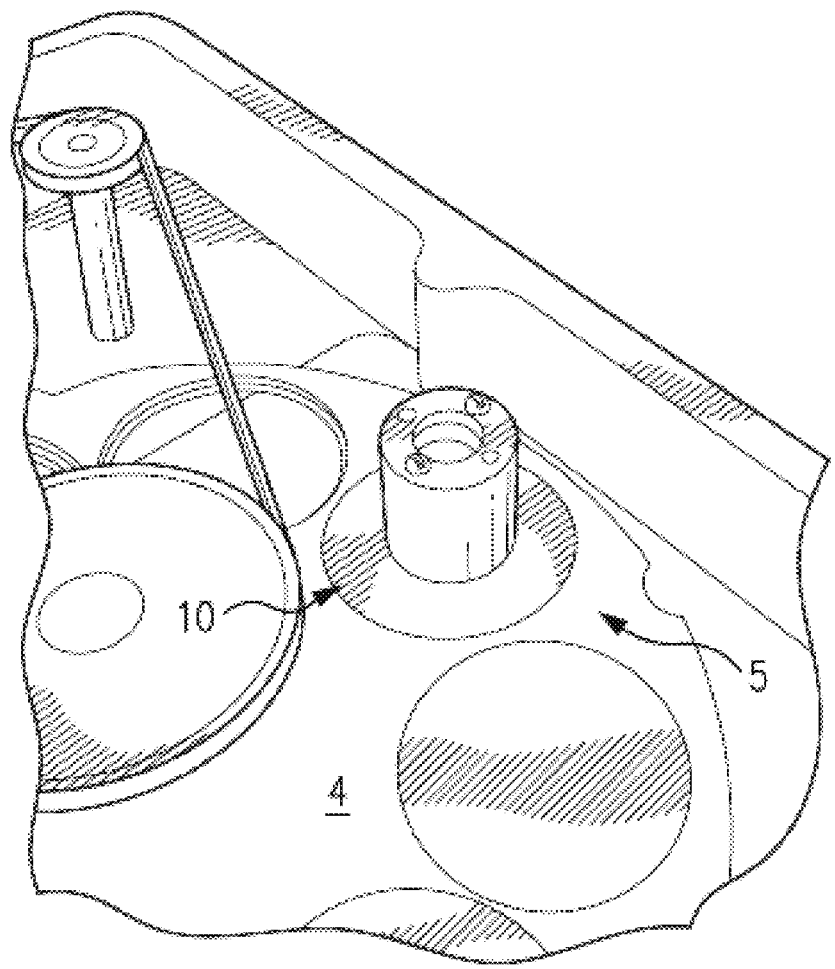
FIG. 3 is a perspective view of the miniature grism system of FIG. 2 placed within a filter wheel of a telescope.

In an aspect, the miniature grism system 10 is configured to be retained within a filter wheel 4 of a telescope 2. As illustrated in FIGS. 1-3, the enclosure 20 includes an end 24 with a flange 25. Other embodiments of the enclosure 120, as shown in FIGS. 5-7, can include ends 124 with a flange 125. The flanges 25, 125 are designed to fit into a slot 5 of the filter wheel 4 where normal imaging filters were installed. The slot 5 (i.e., where the imaging filter would be placed) in the filter wheel 4 can be round or square, and any number of sizes (standard is 1.25 inch or 2 inch). Therefore, the flanges 25, 125 can be configured to match the size of these filter wheel slots 5. The miniature grism system 10 is inserted into a filter slot 5 like any imaging filter. It is secured in the same fashion as standard imaging filters, which varies with filter wheel manufacturer. Mounting the miniature grism system 10 in the filter wheel 5 allows the user to easily switch between imaging and spectroscopic observations. In some embodiments, the miniature grism system 10 can be secured within the slot via fasteners 5a, as shown in FIG. 3. In addition, the miniature grism system 10 can be mounted to a camera 6 without a filter wheel 5. This might require the user to manually remove the miniature grism system 10 from the camera 6 when switching from spectroscopy to imaging.

In an aspect, the miniature grism system described above lets all light from a comparatively large region through for analysis by the CCD associated with the camera, allowing for spectra of multiple sources to be collected at once. In addition, the miniature grism system 10 has an increased resolution compared to a simple grating, which allows the narrow spectral lines to be fully resolved, thus increasing the signal to noise ratio of narrow spectral lines. In addition, the miniature grism system 10 is more sensitive than traditional spectrometers which utilize a slit, thus allowing observers to collect high quality spectra of faint objects using modestly sized telescopes.

Having thus described exemplary embodiments of the invention above, it should be noted by those skilled in the art that the within disclosures are exemplary only and that various other alternatives, adaptations, and modifications may be made within the scope of the present invention.

Accordingly, the present invention is not limited to the specific embodiments as illustrated herein, but is only limited by the following claims.

What is claimed is:

1. A grism system configured for use with a telescope, the grism system comprising:
   a. collimating optics;
   b. a grism oriented next to the collimating optics, the grism comprising:
      i. at least one prism; and
      ii. a grating;
   c. focusing optics oriented next to grism opposite the collimating optics; and
   d. an enclosure housing the collimating optics, the grism, and the focusing optics,
wherein the enclosure is configured to fit into a filter slot of a filter wheel of the telescope.

2. The grism system of claim 1, wherein the grism system is configured to generate a spectrum to be captured by a camera associated with the telescope for spectroscopy.

3. The grism system of claim 2, wherein the grism system does not need to be removed from the telescope for the camera to be used for imaging.

4. The grism system of claim 1, wherein the grism system is configured to function as a spectrometer that produces low-resolution spectra of astronomical objects.

5. The grism system of claim 1, wherein the collimating optics comprises at least one collimating lens.

6. The grism system of claim 5, wherein the at least one collimating lens comprises an achromatic lens.

7. The grism system of claim 6, wherein the focusing optics comprises at least one achromatic focusing lens.

8. The grism system of claim 1, wherein the grism is configured to make a spectrum that travels straight along an optical axis to a center of a camera associated with the telescope.

9. The grism system of claim 8, wherein the at least one prism comprises a prism deviation angle and the grating comprises a grating deviation angle, wherein the prism deviation angle equals the grating deviation angle.

10. The grism system of claim 9, wherein the at least one prism comprises a plurality of prisms, wherein the sum of the plurality of prism deviation angles equals the grating deviation angle.

11. The grism system of claim 10, wherein the plurality of prisms comprises two prisms oriented on opposite sides of the grating.

12. The grism system of claim 1, wherein the at least one prism is coated with an anti-reflective coating.

13. The grism system of claim 1, wherein the grating comprises a transmission grating.

14. The grism system of claim 13, wherein the transmission grating comprises a ruled grating.

15. The grism system of claim 14, wherein the ruled grating comprises a blazed grating.

16. The grism system of claim 1, wherein the grating is etched into a surface of the at least one prism.

17. The grism system of claim 1, wherein the grism system is configured to work with telescopes having a fast focal ratio.

18. A grism system configured for use with a filter wheel of a telescope having a camera, the grism system configured to produce a spectrum, the grism system comprising:
   a. at least one achromatic collimating lens;
   b. a grism comprising:
      i. a first prism having a first prism deviation angle;
      ii. a second prism having a second prism deviation angle; and
      iii. a blazed transmission grating having a deviation angle, the grating positioned between the first and second prisms, wherein the sum of the first and the second prism deviation angles equals the grating deviation angle;
   c at least one achromatic focusing lens oriented next to the grism opposite the at least one achromatic collimating lens; and
   d. an enclosure housing the at least one achromatic collimating and focusing lenses, and the grism, the enclosure configured to be retained within a slot of the filter wheel, wherein the grism system allows the camera of the telescope to operate between spectroscopy and imaging without removing the grism system from the telescope.

19. A grism system configured for use with a telescope, the grism system comprising:
   a. collimating optics;
   b. a grism oriented next to the collimating optics, the grism comprising:
      i. at least one prism; and
      ii. a grating;
   c. focusing optics oriented next to grism opposite the collimating optics; and
   d. an enclosure housing the collimating optics, the grism, and the focusing optics,
wherein the enclosure is configured to fit into a filter slot of a filter wheel of the telescope, wherein the grism system is configured to generate a spectrum to be captured by a camera associated with the telescope for spectroscopy, and the grism system is further configured to allow the camera to be used for imaging without the grism system being removed from the telescope.

20. The grism system of claim 19, wherein the grism system is configured to work with telescopes having a focal ratios ranging approximately between f/5 and f/12.

* * * * *